un(12) United States Patent
Wood et al.

(10) Patent No.: US 9,976,744 B2
(45) Date of Patent: May 22, 2018

(54) REHEAT BURNER ARRANGEMENT HAVING AN INCREASING FLOW PATH CROSS-SECTION

(71) Applicant: Ansaldo Energia Switzerland AG, Baden (CH)

(72) Inventors: John Philip Wood, Rütihof (CH); Andrea Ciani, Zürich (CH); Andre Theuer, Baden (CH); Douglas Anthony Pennell, Windisch (CH); Ewald Freitag, Baden (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 695 days.

(21) Appl. No.: 14/063,065

(22) Filed: Oct. 25, 2013

(65) Prior Publication Data
US 2014/0123665 A1   May 8, 2014

(30) Foreign Application Priority Data

Oct. 25, 2012 (EP) .................................... 12190051

(51) Int. Cl.
*F23R 3/20* (2006.01)
*F23R 3/16* (2006.01)
(Continued)

(52) U.S. Cl.
CPC ............. *F23R 3/20* (2013.01); *F02C 6/003* (2013.01); *F23R 3/12* (2013.01); *F23R 3/16* (2013.01);
(Continued)

(58) Field of Classification Search
CPC ...... F23R 3/12; F23R 3/16; F23R 3/18; F23R 3/20; F23R 3/34; F23R 3/346;
(Continued)

(56) References Cited

U.S. PATENT DOCUMENTS 4,587,809 A * 5/1986 Ohmori ................ B01F 5/0451
60/737
4,932,861 A 6/1990 Keller et al.
(Continued)

FOREIGN PATENT DOCUMENTS

CN 102007342 4/2011
EP 0 620 362 10/1994
(Continued)

OTHER PUBLICATIONS

Examination Report dated Mar. 30, 2017 in corresponding Gulf Cooperation Counsel Patent Application No. GC 2013-25620 (4 pages).
(Continued)

*Primary Examiner* — Gerald L Sung
*Assistant Examiner* — Scott Walthour
(74) *Attorney, Agent, or Firm* — Buchanan Ingersoll & Rooney PC

(57) ABSTRACT

A reheat burner arrangement including a center body, an annular duct with a cross-section area, an intermediate fuel injection plane located along the center body and being actively connected to the cross section area of the annular duct, wherein the center body is located upstream of a combustion chamber, wherein the structure of the reheat burner arrangement is defined by various parameters and the structure of the reheat burner arrangement is defined by various dependencies.

17 Claims, 6 Drawing Sheets

(51) Int. Cl.
    *F02C 6/00*     (2006.01)
    *F23R 3/34*     (2006.01)
    *F23R 3/12*     (2006.01)
    *F02C 6/02*     (2006.01)
    *F23R 3/18*     (2006.01)

(52) U.S. Cl.
    CPC ............... *F23R 3/34* (2013.01); *F23R 3/346* (2013.01); *F02C 6/02* (2013.01); *F05D 2250/12* (2013.01); *F05D 2250/13* (2013.01); *F23R 3/18* (2013.01); *F23R 2900/03341* (2013.01)

(58) Field of Classification Search
    CPC .. F23R 2900/03341; F02C 6/02; F02C 6/003; F05D 2250/12; F05D 2250/13
    See application file for complete search history.

(56) References Cited

U.S. PATENT DOCUMENTS

| | | | |
|---|---|---|---|
| 5,423,608 A | | 6/1995 | Chyou et al. |
| 5,431,018 A | | 7/1995 | Keller |
| 5,617,718 A | * | 4/1997 | Althaus ................... F02C 6/003 60/39.17 |
| 5,626,017 A | | 5/1997 | Sattelmayer |
| 5,791,892 A | * | 8/1998 | Dobbeling ............... F23D 14/02 431/175 |
| 5,860,360 A | | 1/1999 | Lane, III et al. |
| 6,176,087 B1 | * | 1/2001 | Snyder .................... F23C 7/002 239/403 |
| 2002/0187448 A1 | | 12/2002 | Eroglu et al. |
| 2006/0191269 A1 | * | 8/2006 | Smith ...................... F23C 13/06 60/776 |
| 2009/0184181 A1 | * | 7/2009 | Berry ...................... F23D 14/62 239/554 |
| 2010/0300109 A1 | * | 12/2010 | Carroni .................... F23R 3/286 60/776 |
| 2011/0314825 A1 | | 12/2011 | Stryapunin et al. |
| 2012/0047901 A1 | * | 3/2012 | Buss ....................... F23C 3/002 60/740 |

FOREIGN PATENT DOCUMENTS

| | | |
|---|---|---|
| EP | 0849530 | 6/1998 |
| EP | 1 257 809 | 11/2002 |
| EP | 2 369 236 | 9/2011 |
| EP | 2 496 882 | 9/2012 |
| GB | 2 216 999 | 10/1989 |
| WO | 01/63257 | 8/2001 |
| WO | 2011/054757 | 5/2011 |
| WO | 2011/054760 | 5/2011 |
| WO | 2011/054766 | 5/2011 |
| WO | 2011/061059 | 5/2011 |

OTHER PUBLICATIONS

Examination Report dated Sep. 29, 2017 issued by the GCC Patent Office in corresponding GCC Patent No. GC 2013-25620.

* cited by examiner

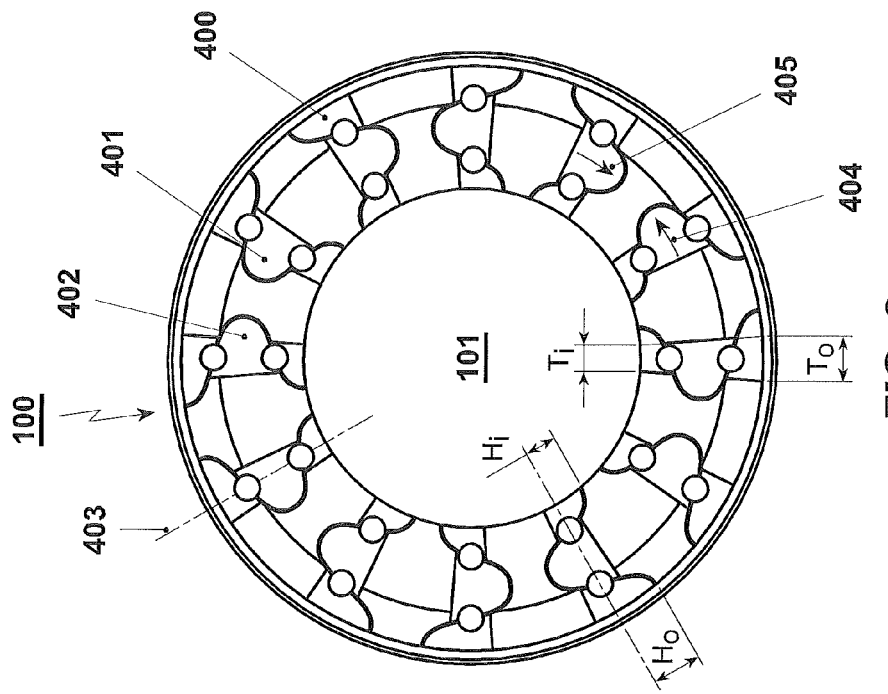
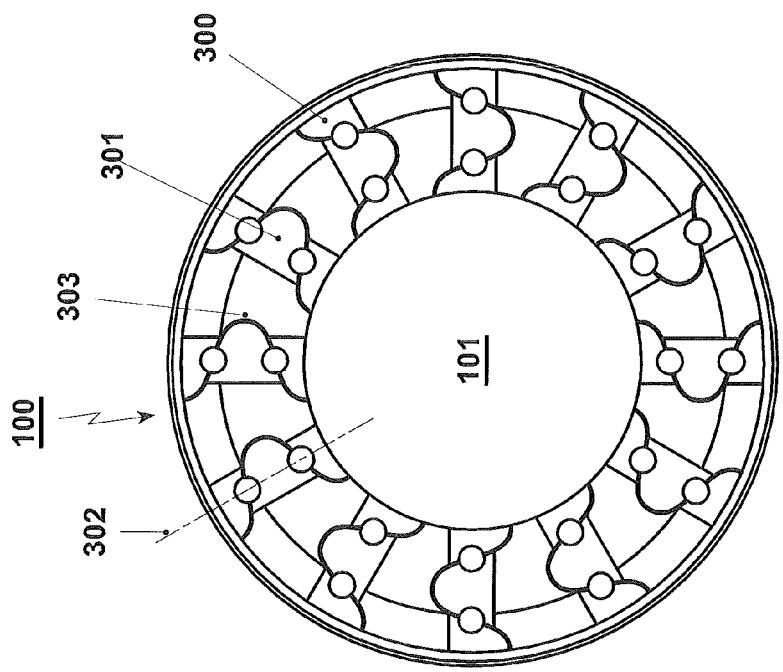

REHEAT BURNER ARRANGEMENT HAVING AN INCREASING FLOW PATH CROSS-SECTION

CROSS-REFERENCE TO RELATED APPLICATIONS

This application claims priority to European application 12190051.8 filed Oct. 25, 2012, the contents of which are hereby incorporated in its entirety.

TECHNICAL FIELD

The present invention relates to a burner for premixing purposes in gas turbines. In particular it relates to a burner for a combustion chamber in a reheat process. Moreover, it relates to a method of operation of such a burner.

BACKGROUND

In order to achieve a high efficiency, a high turbine inlet temperature is required in standard gas turbines. As a result, there arise high NOx emission levels. These emissions can be mitigated with a sequential combustion. The main flow passes the first combustion chamber (e.g. using a burner of the general type as disclosed in EP 1 257 809 or as in U.S. Pat. No. 4,932,861, also called EV combustor, where the EV stands for environmental), wherein a part of the fuel is combusted. The remaining fuel is added and combusted (e.g. using a burner of the type as disclosed in U.S. Pat. No. 5,431,018 or U.S. Pat. No. 5,626,017 or in US 2002/0187448, also called SEV combustor, where the S stands for secondary). Both combustors contain premixing burners, as low NOx emissions require high mixing quality of the fuel and the oxidizer.

Since the second combustor is fed by exhaust gas of the first combustor (potentially cooled with some additional cooling air), the operating conditions allow self-ignition (spontaneous ignition) of the fuel air mixture without additional energy being supplied to the mixture. To prevent ignition of the fuel air mixture in the mixing region, the residence time therein must not exceed the auto ignition delay time. This criterion ensures flame-free zones inside the burner. This criterion poses challenges in obtaining appropriate distribution of the fuel across the burner exit area.

The subsequent mixing of the fuel and the oxidizer at the exit of the mixing zone is just sufficient to allow low NOx emissions (mixing quality) and avoid flashback (residence time), which may be caused by auto ignition of the fuel air mixture in the mixing zone.

Current designs are limited due to the relation of burner exit area, flow velocity and post injection residence time in the burner. This poses difficulties in achieving circumferential mixing.

SUMMARY

An object of the present disclosure is to reduce or avoid the limitations in design of downstream components, for example combustion chamber and turbine components, when utilizing a limited burner exit area. The burner exit area is limited to assure sufficient flow velocity inside the burner to avoid flash back into the burner. However, a minimum length from fuel injection location to the burner exit is required to allow for sufficient mixing inside the burner.

This object is achieved by providing a burner, in particular for a secondary combustion chamber of a gas turbine with a first and a second combustion chamber, with an injection device for the introduction of at least one gaseous fuel into the burner, wherein the injection device of this burner has at least one body or lance which is arranged in the burner and wherein this body has at least one nozzle for introducing the at least one gaseous fuel into the burner.

According to one embodiment the at least one body can be configured as a streamlined body which has a streamlined cross-sectional profile and which extends with a longitudinal direction perpendicularly to or at an inclination to a main flow direction prevailing in the burner. The at least one nozzle can have its outlet orifice at or in a trailing edge of the streamlined body. The body in accordance with the invention has two lateral surfaces (normally at least for one central body essentially parallel to the main flow direction and converging, i.e. inclined for the others), and upstream of the at least one nozzle on at least one lateral surface there is located at least one vortex generator.

Such burner for a secondary combustion chamber can be a part of a gas turbine with sequential combustion, in which the gas turbine comprises a compressor, a first combustor with a first combustion chamber and a first burner, which receive compressed air from the compressor, a second combustor with a second combustion chamber and secondary (also referred to a second burner), which receive hot gas from the first combustor with a predetermined second combustor inlet temperature, and a turbine, which receives hot gas from the second combustor. A turbine can be arranged between the first and the second combustor.

One aspect of the invention is to merge the vortex generator aspect and the fuel injection device as conventionally used according to the state-of-the-art as separate elements (separate structural vortex generator element upstream of separate fuel injection device) into one single combined vortex generation and fuel injection device.

By doing this, mixing of fuels with oxidation air and vortex generation take place in very close spatial vicinity and very efficiently, such that more rapid mixing is possible and the length of the mixing zone can be reduced. It is even possible in some cases, by corresponding design and orientation of the body in the oxidizing air path, to omit the flow conditioning elements (turbine outlet guide vanes) as the body may also take over the flow conditioning. All this is possible without severe pressure drop along the injection device such that the overall efficiency of the process can be maintained.

In one burner at least one such injection device is located, preferably at least two such injection devices are located within one burner. Typically a multitude of radially extending injection devices are arranged around the center body, for example 10, 12, 14 or more such injection devices are located within one burner.

In the first system fuel and air are premixed and a propagating flame is stabilised using carefully controlled aerodynamic structures.

In the second combustion system fuel is injected into the exhaust gas of the first system and mixed before combustion occurs. As the inlet temperature to this combustor system is in excess of the auto-ignition temperature of the fuel combustion occurs after a characteristic delay time.

As such there is no need for complex aerodynamic flame stabilisation devices as the flame will be self-stabilising at a predetermined location given by the flow velocity and the characteristic auto-ignition delay time.

As the flame in the second combustor is initiated by auto-ignition, the post injection residence time, i.e. the residence time downstream of the ignition plane, and hence post injection burner volume, is an important functional characteristic.

While the post injection volume is set by the inlet conditions through the auto-ignition process the length of the burner downstream plane must be maximised to ensure high quality mixing. For this reason the burner exit area coupled with the burner mean stream velocity are a very restricted design parameter in a general reheat combustion system, for example that the current sequential combusted gas turbines, known as GT24/GT26 and for example according to EP 0 620 362 A1, wherein this document forms an integral part of the present description.

When integrating the burner with the combustion chamber, or other downstream components, a number of additional design requirements can set constraints on the choice of burner exit. These additional requirements can conflict with the necessary burner area based on the auto-ignition process. This can lead to the necessity of making difficult design compromises.

If the combustion system is required to be configured in a can-combustor system, then an axial-symmetric design, e.g. a cylindrical design, is clearly attractive. However, this introduces a significant further issue when applying the concept of radially extending injection devices because of the increased circumferential mixing needed at larger radii due to the increased separation of the radially extending injection devices.

This is problematic to achieve and is not well aligned with the concept of radially extending injection device that have been previously considered. Furthermore, the radial step between the outside wall of the burner exit and the combustion chamber wall at the combustion chamber inlet, which is necessary for flame anchoring with varying auto-ignition time fuel air mixtures, generally increases in proportion with the overall size of the combustion system. For large systems re-attachment of the flow leaving the burner to the combustion chamber wall does not take place inside the reaction zone or only far downstream in the reaction zone. This late reattachment can lead to an instable combustion and incomplete combustion.

It is an object of the present invention to provide an improved reheat burner concept which incorporates a large center body, relative to the burner exit area. A center body is large, when the ratio of area of the downstream face of the center body to the burner exit area including the center body downstream face is greater than 0.6, preferably greater than 0.8.

This center body starts upstream of an injection plane, in which the fuel is injected into a duct between the center body and an outer burner wall, and then the center body continues downstream to the exit of the burner. The center body is located upstream of a second combustion chamber and terminates at a second combustion chamber inlet. The cross section of a flow duct delimited by the burner and the subsequent second combustion chamber increases in a stepwise manner from a burner exit to the second combustion chamber inlet. The step from the outer burner wall to the combustion chamber inlet is limited to assure good re-attachment of the flow leaving the burner to the second combustion chamber outer wall. The step can be characterized by the ratio of the perimeter of the combustion chamber inlet to the perimeter of the burner exit. According to an embodiment the ratio of the perimeter of the burner exit to the perimeter of the combustion chamber inlet in the range of 0.6 to 1. According to a further embodiment the ratio is in the range of 0.7 to 0.9. According to yet a further embodiment the ratio is in the range of 0.8 to 1.

The center body provides better mixing by virtue of increased length to height ratio of the fuel injection device and mixing path for equivalent residence times to previously described design embodiments and is matched to the burner and combustor area.

According to a an embodiment the center body has a circular cross section, the combustion chamber inlet has a circular cross section, and the burner outlet has an annular cross-section. In this embodiment the center body can exhibit at its end in the flow direction a cylindrical or quasi-cylindrical end with respect to the cross-sectional area between the outer diameter of the annular duct and the afterwards second combustion chamber. A whole, partial or intermediate conical topography of the center body's surface with respect to the cross sectional area of the annular duct is also possible.

The center body can be designed with different dimensions with respect to the cross sectional area of the annular duct and the combustion chamber.

The injection plane consists of at least one injection device that is disposed radially or quasi radially to the center body. The injection device for the introduction of at least one fuel into the annular duct of the burner has at least one streamlined body which is arranged in the annular space of the burner comprising at least one nozzle for introducing the at least one fuel into the annular duct of the burner.

The profile of the streamlined body can be parallel to the main flow direction. It can however also be inclined with respect to the main flow direction at least over a certain part of its longitudinal extension wherein for example the profile of the streamlined body can be rotated or twisted, for example in opposing directions relative to the longitudinal axis on both sides of a longitudinal midpoint, in order to impose a mild swirl on the main flow.

As injection devices flutes as known for example from the EP2496882 can be used. Such a flute has at least one body which is arranged in the burner with at least one nozzle (for introducing the at least one gaseous or liquid fuel into the burner), the at least one body being configured as a streamlined body which has a streamlined cross-sectional profile and which extends with a longitudinal direction perpendicularly or at an inclination to a main flow direction prevailing in the burner, wherein the body has two lateral surfaces essentially parallel to the main flow direction. Further, such a flute comprises at least one nozzle for introducing at least one fuel into the burner.

Also lobed streamlined bodies can be used as injection devices. Each lobed streamlined body has a streamlined cross-sectional profile, which extends with a longitudinal direction perpendicularly or at an inclination to a main flow direction prevailing in the burner, wherein with reference to a central plane of the streamlined body the trailing edges are provided with at least two lobes in opposite transverse directions. Further, such a lobed streamlined body comprises at least one nozzle for introducing at least one fuel into the burner.

According to one embodiment the transverse displacement of the streamlined body forming the lobes is only at most in the downstream two thirds of the length of the streamlined body preferably only in the downstream half of the length of the streamlined body.

Further, a spraybar as known for example from the GB2216999 can also be used as injection devices.

The inserted vortex generator(s) can also be provided with cooling elements, wherein preferably these cooling elements are effusion/film cooling holes provided in at least one of the surfaces (also possible is internal cooling such as impingement cooling) of the vortex generator. The film cooling holes can be fed with air from the carrier gas feed also used for the fuel injection to simplify the setup. Due to the in-line injection of the fuel, lower pressure carrier gas can be used, i.e. in the range of 10 to 35 bar, preferably in the range of 16 to 25 bar, so the same gas supply can be used for fuel injection and cooling.

The above mentioned nozzle for introducing the fuel into the annular duct has its outlet orifice at or in a trailing edge of the streamlined body. The streamlined body has two lateral surfaces. Upstream of the mentioned nozzle on at least one lateral surface there is located at least one vortex generator.

Generally speaking, vortex generators as they are disclosed in U.S. Pat. No. 5,423,608 B1 can be used in the present context; the disclosure of these two documents being specifically incorporated into this disclosure.

A further preferred embodiment is characterized in that the streamlined body comprising at least two, three, four or more nozzles which are arranged at different positions along said trailing edge (in a row with spacings in between), wherein upstream of each of these nozzles at least one vortex generator is located.

It is possible to have two vortex generators on opposite sides of the body for one nozzle or for a pair of nozzles.

Generally "upstream" in the context of the vortex generators relative to the nozzles is intending to mean that the vortex generator generates a vortex at the position of the nozzle. The vortex generators may also be upstream facing the nozzle in order to bring the vortices closer to the fuel injection location.

Preferably vortex generators to adjacent nozzles (along the row) are located at opposite lateral surfaces of the body. Even more preferably two, three, four or more nozzles are arranged along said trailing edge and vortex generators are alternatingly located at the two lateral surfaces.

On the one hand it is possible to have at least one nozzle injecting fuel and/or carrier gas parallel to the main flow direction. This allows having higher reactivity conditions as the fuel is carried downstream very rapidly and additionally allows the use of low pressure carrier gas. The fuel jet can be surrounded by cool carrier-gas (or carrier air) that delays spontaneous ignition until the mixture has reached the combustion zone. Carrier gas can also be injected together with fuel to increase the penetration of the fuel into the combustion air for better distribution and mixing.

It is also possible that at least one nozzle injects fuel and/or carrier gas at an inclination angle with respect to the main flow direction. A nozzle may therefore inject fuel and/or carrier gas at an inclination angle ranging from and including 0 to 30° with respect to the main-flow direction. Also inclination angles up to 60° are possible. The inclination angle of the fuel can be used to optimize mixing and to adjust the residence time of the fuel in the burner.

According to one embodiment, downstream of each vortex generator there are located at least two nozzles for fuel injection at the trailing edge.

In yet another embodiment the at least one streamlined body has a streamlined cross-sectional profile and it extends with a longitudinal or at an inclination to the main flow direction prevailing in the annular duct of the burner. The mentioned nozzle for introducing the fuel into the annular duct has its outlet orifice at or in a leading edge of the streamlined body.

The leading edge area of each streamlined body has a profile, which is oriented parallel to a main flow direction prevailing at the leading edge position. The transition from a planar leading edge region to the deflections typically is smooth with a surface curvature representing a function with a continuous first derivative.

A further preferred embodiment is characterized in that the injection plane consists beforehand also of at least one injection device that is disposed radially or quasi radially to the center body. The streamlined bodies having at its downstream end a number of vortex generators and/or lobes which are arranged with respect to one or more neighboring streamlined bodies in phase/or out of phase with each other. In this case the fuel nozzle or fuel nozzles are arranged concentrically at the trailing edge. In an arrangement with lobed streamlined body a nozzle is preferentially located where the lobed trailing edge crosses the center plane. In an arrangement with vortex generators the nozzle is preferably arranged downstream of a vortex generator. Referring to the fuel nozzles an arrangement propounds first nozzles for injection of liquid fuel, are enclosed by second nozzles for injection of a gaseous fuel, which themselves are encloses by third nozzles or injection of carrier air.

Additionally, it is possible to provide an arrangement, in which a second nozzle for fuel gas injection is configured as one slit-like nozzle extending along at least one lobe along the trailing edge. For liquid fuel injection additional first nozzles in the form of orifices are arranged in the second nozzles.

In a further preferred embodiment of the height of the injection device, i.e. the height of lobed or the height of the vortex element increases with its radial position such that the strength of the generated vortices would increase along the length of the radially extending injection device such that additional circumferential mixing is provided towards the outboard end of the radially extending injection device.

The advantages of the above identified designs are that:
1. For a predefined post injection mixing volume and length any burner external diameter can be achieved through the appropriate choice of center body diameter.
2. Burner hardware can be set out to provide appropriate dimensions for downstream components, for example the combustion chamber or turbine components.
3. The radial or quasi-radial divergence of neighboring radially extending injection devices is minimized by the small height of the annular duct. This ensures the applicability of previous flute experience is maintained.
4. The small radial divergence of neighboring radially extending injection device minimizes the requirement for increased circumferential mixing at the outboard end, relative to the center body, of the radially extending injection device. This ensures good mixing characteristics are maintained.

Additionally, other advantages can be summarized as follows:
5. Higher burner velocities to accommodate highly reactive fuels.
6. Lower burner pressure drop for similar mixing levels achieved with current designs.
7. Second combustion chamber operable at higher inlet temperatures for a burner pressure drop equivalent to current designs.
8. Possibility to remove or replace high-pressure carrier air with lower pressure carrier air.

9. Improved mixing quality and reduced NOx emissions for the same bulk fuel-air mixture residence time by virtue of increased mixing length to injector height ratio for same or larger power output than current burner designs.

With respect to performing a reasonable fuel air mixing, the following components of current burner systems are of interest:

10. At the entrance of the second combustion chamber, the main flow must be conditioned in order to guarantee uniform inflow conditions independent of the upstream disturbances, e.g. caused by the high-pressure turbine stage.

Furthermore:

11. Homogeneous mixing of fuel and combustion air with minimum pressure drop are the preconditions for the design of highly efficient modern gas turbines. Homogeneous mixing is required to avoid local maxima in the flame temperature, which lead to high NOx emissions. Low pressure drops are advantageous because the pressure drop in the combustor is directly impairing power and efficiency of a gas turbine.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same.

In the drawings,

FIG. 5 shows another reheat burner arrangement in a cross-sectional view;

FIG. 6 shows another reheat burner arrangement in a cross-sectional view;

DETAILED DESCRIPTION

Figure 1:
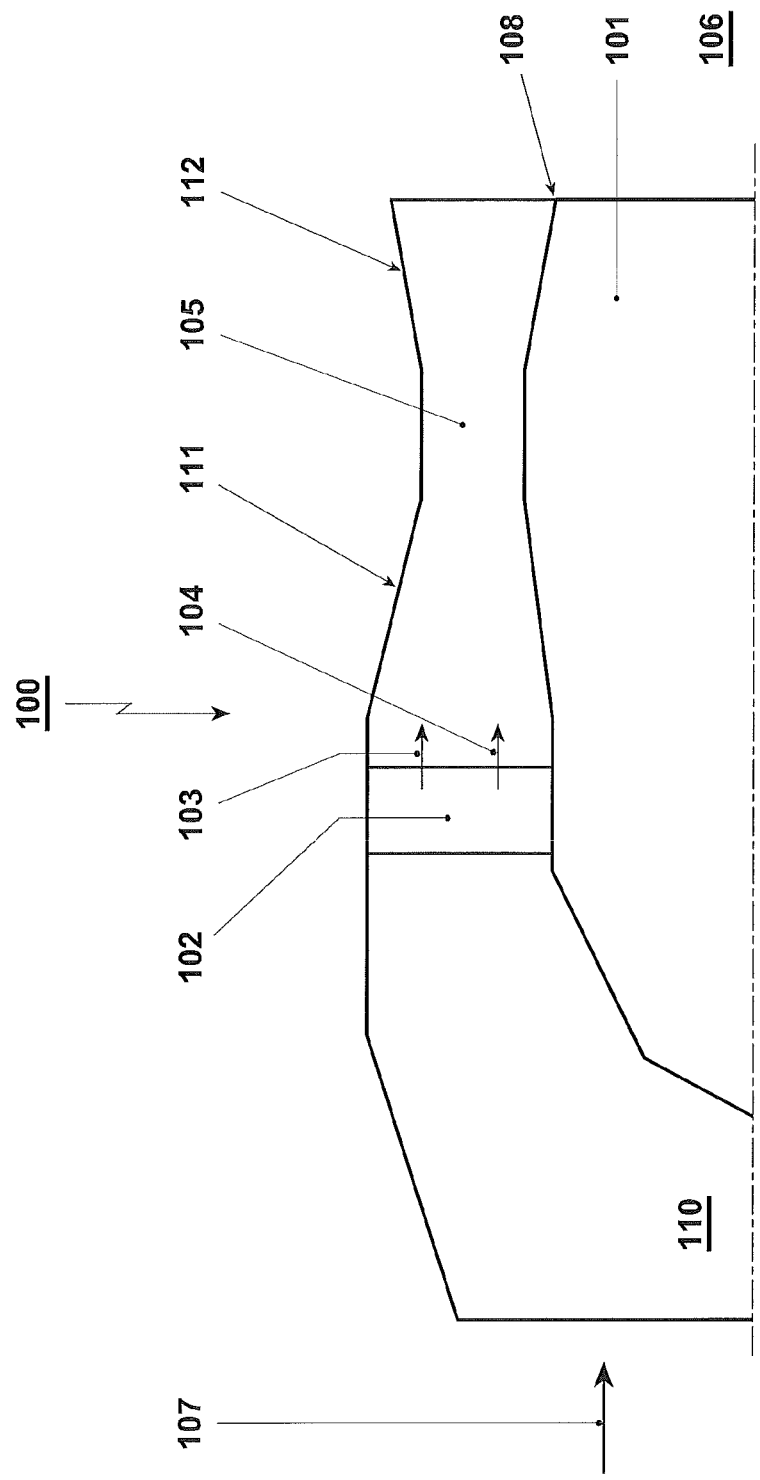
FIG. 1 shows a reheat burner arrangement which incorporates a large center body, relative to the burner exit diameter.

FIG. 1 shows a reheat burner arrangement 100 which incorporates a center body 101. The shown center body starts upstream of an injection plane 102, causing the fuel 103 and carrier air 104 to be injected into an annular duct 105, and then the center body continues downstream to the exit 106 of the burner arrangement 100. The center body 101 is being actively connected to the main flow 107 of hot gases. The center body 101 provides better mixing and matches burner and combustor area. With respect to a premix burner according to the present invention the center body 101 can be provided with a fuel supply line (not shown). The center body 101 exhibits at its end 108 in the flow direction of the main flow 107 a cylindrical or quasi-cylindrical end (see also FIG. 2) with respect to the cross-sectional area between the annular duct 105 and the afterwards combustion chamber (see FIG. 2, item 109). A whole, partial or intermediate conical topography of the center body's surface with respect to the cross sectional area of the annular duct is, as required, also possible. The center body 101 with respect to the adjacent elements can be designed with different dimensions, especially with respect to the cross sectional area of the annular duct and the combustion chamber.

Accordingly, the proposed reheat burner arrangement in FIG. 1 is shown with reduced exit cross-section area with respect to the combustion chamber 109. In this case downstream of an inlet side 110 of the burner arrangement there is located the center body 101 and intermediate along the length of the center body 101 and within the cross-section area of the annular duct 105 there is located a fuel injection plane 102, which is given as a streamlined body extending in longitudinal direction (see FIG. 4). At the position where the streamlined body is located, or downstream of this location, at least the outer wall of the annular duct 105 converge in a converging portion 111 and narrow down to a reduced cross-sectional area of the annular duct. This defines the mixing space 105, which ends at the outlet side 108 where the mixture of fuel and air enters the combustion chamber or combustion space 109, which is delimited by walls 212. Downstream of such a converging portion the cross-sectional area of the annular duct may progressively increase, forming the shape of a diffuser.

Relating to the injection plane 102 homogeneous mixing of fuel 103 and combustion air 104 with minimum pressure drop are preconditions for the design of highly efficient modern gas turbines. Homogeneous mixing is required to avoid local maxima in the flame temperature, which lead to high NOx emissions. Low pressure drops are advantageous because the pressure drop in the combustor is directly impairing power and efficiency of a gas turbine.

Figure 2:
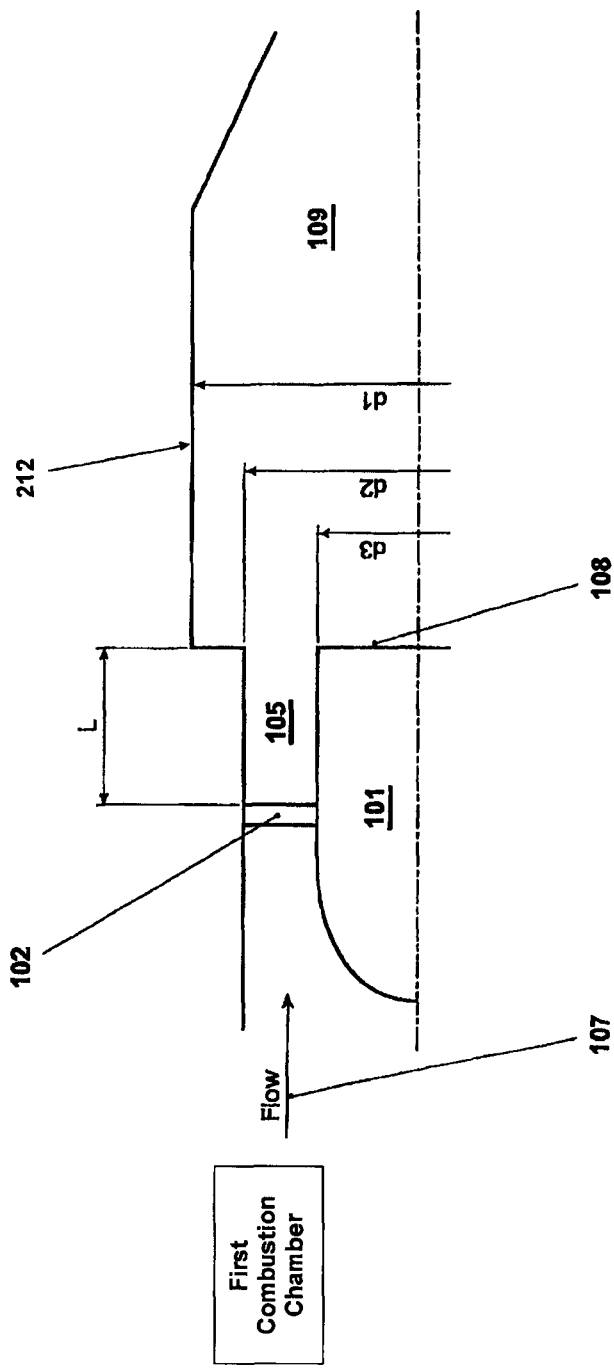
FIG. 2 shows a structure of the reheat burner arrangement with defined parameters.

FIG. 2 shows a structure of the reheat burner arrangement with defined parameters in connection with the center body 101 and the adjacent elements. The structure of the reheat burner arrangement is defined by the following parameters:

d1=external diameter of the combustion chamber 109;
d2=external diameter of the annular duct 105;
d3=external diameter of the center body 101;
dh=hydraulic diameter of the annular duct 105;
L=intermediate length between the top of the combustion chamber 109 at the end of the annular duct 105 and the end of the injection plane 102 in flow direction 107.
dN=equivalent diameter of the annular duct 105 exit area
A=cross sectional area of the annular duct 105
P=length of perimeter of annular duct 105 ($\pi*d2+\pi*d3$)

The structural dependencies of the above identified parameters are defined as follows:

$d3/d2=sqrt[1-(dN/d2)^2]$
$dN^2=d2^2-d3^2$
$dh=4A/P$
$dh=(d2^2-d3^2)/(d2+d3)$
$dh<dN$
$L/dh>L/dN$
d2/d1 in the range of 0.6 to 1 to improve the mixing and reattachment of a flow from the annular duct (105) to the walls (212) of the combustion chamber (109).

Figure 3:
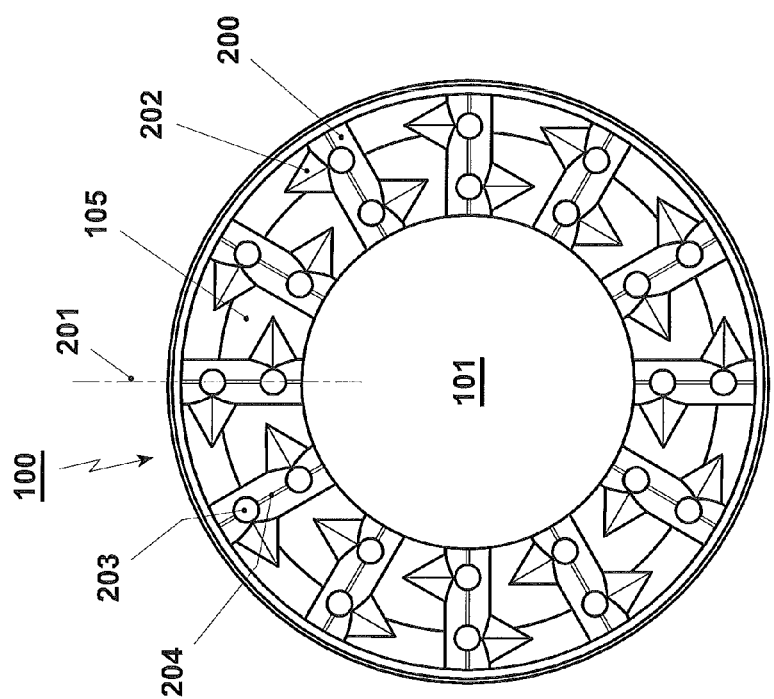
FIG. 3 shows the reheat burner arrangement in a cross-sectional view.

FIG. 3 shows the reheat burner arrangement 100 in a cross-sectional view. Distributed at the circumference of the center body 101 there are a number of radial arranged streamlined bodies 200 within the annular duct 105, as bond-bridge of the flow gap. The streamlined bodies 200 have a longitudinal axis 201, which are arranged normal to the longitudinal axis of the injection plan and normal to the inlet flow direction 107 (see FIG. 2), which in this example is parallel to the longitudinal axis. To assure good mixing a flow field with turbulent dissipation is induced over the complete cross section of the flow path by arranging two or more streamlined bodies 200 in the flow path.

The vortex generators 202 on the streamlined bodies 200 have essentially the same periodicity, but in/or out of phase, i.e. the number of vortex generators at the trailing edge of each streamlined body 200 is preferably identical and the vortex generators on neighboring streamlined bodies 200 are preferably arranged in out of phase. In particular the phases are shifted by 180°, i.e. the vortex generators of both streamlined bodies 200 cross the center line at the same position in longitudinal direction, and at the same position in longitudinal direction the deflection of each body has the same absolute value but is in opposite direction. Along the trailing edge 204 of the streamlined bodies 200 there is located at least one fuel nozzle 203 and/or a fuel nozzle is located on the central plane of the vortex generator provided trailing edge 204 of the streamlined body 200, and preferably at each position in the plane of each adjacent vortex generator 202, located at opposite lateral surface of the streamlined body 200.

Figure 4:
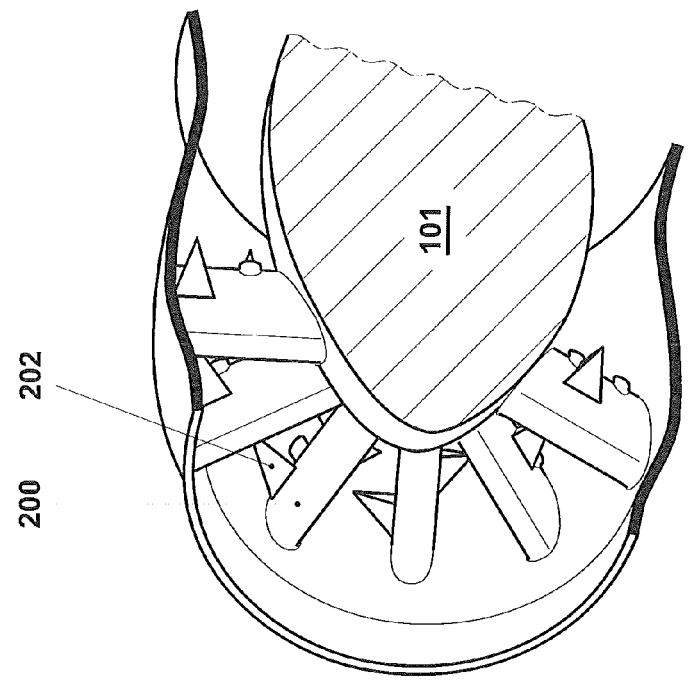
FIG. 4 shows a perspective view of the reheat burner arrangement.

FIG. 4 shows a perspective view of the reheat burner arrangement comprising the center body 101, a number of streamlined bodies with vortex generators 202 on the trailing edge (see FIG. 3).

FIG. 5 shows the reheat burner arrangement 100 in a cross-sectional view. The leading edge area of each streamlined body 300 has a profile, which is oriented parallel to a main flow direction prevailing at the leading edge position, and wherein, with reference to a central plane 302 of the streamlined bodies 300 the leading edges are provided with at least one lobe 301, 303, or at least two complementary lobes. The surface curvature of the lobes 303 run in conjunction with each other in the same direction. The traverse or quasi-traverse deflections from the central plane of two adjacent streamlined bodies (300), which form the lobes 303, are in alignment with each other.

FIG. 6 shows the reheat burner arrangement 100 in a cross-sectional view. The leading edge area of each streamlined body 400 has a profile, which is oriented parallel to a main flow direction prevailing at the leading edge position, and wherein, with reference to a central plane 403 of the streamlined bodies 400 the leading edges are provided with at least one lobe 401, 402, or at least two complementary lobes, in opposite transverse directions 404, 405. The traverse deflection from the central plane of two adjacent streamlined bodies 400 which form the lobes 401, 402 are inverted in that the transition from a planar leading edge region to the deflections is smooth with a surface curvature representing a function with a continuous first derivative.

The reactivity can be slowed down by diluting the fuel air mixture with nitrogen or steam, respectively.

De-rating of the first stage can lead to less aggressive inlet conditions for the second burner in case of highly reactive fuels. In turn, the efficiency of the overall gas turbine may decrease.

The length of the mixing zone can be kept constant, if in turn the main flow velocity is increased. However, then normally a penalty on the pressure drop must be taken.

By implementing more rapid mixing of the fuel and the oxidizer, the length of the mixing zone can be reduced while maintaining the main flow velocity.

Accordingly, the main goal of this invention is to evolve an improved burner configuration, wherein the latter two points are addressed, which however can be combined also with the upper three points. In order to allow capability for highly reactive fuels, the injector is designed to perform flow conditioning (at least partial), injection, and mixing, simultaneously.

As a result, the injector can save burner pressure loss, which is currently utilized in the various devices along the flow path. If the combination of flow conditioning device, vortex generator and injector is replaced by the proposed invention, the velocity of the main flow can be increased in order to achieve a short residence time of the fuel air mixture in the mixing zone.

In the example shown in FIG. 6 the lobe height is a function of the radial position. In this example the lobe height H is increasing from a small lobe height $H_i$ at the inner diameter of the annular flow duct to a larger lobe height $H_o$ at the outer diameter of the annular flow duct of the burner. Thus the vortex and circular mixing is increasing with increasing diameter. In this example also the thickness of the streamlined body is a function of the radial position. In this example the thickness of the streamlined body is increasing from a small thickness $T_i$ at the inner diameter of the annular flow duct to a larger thickness of the streamlined body $T_o$ at the outer diameter of the annular flow duct of the burner.

Figure 7C:
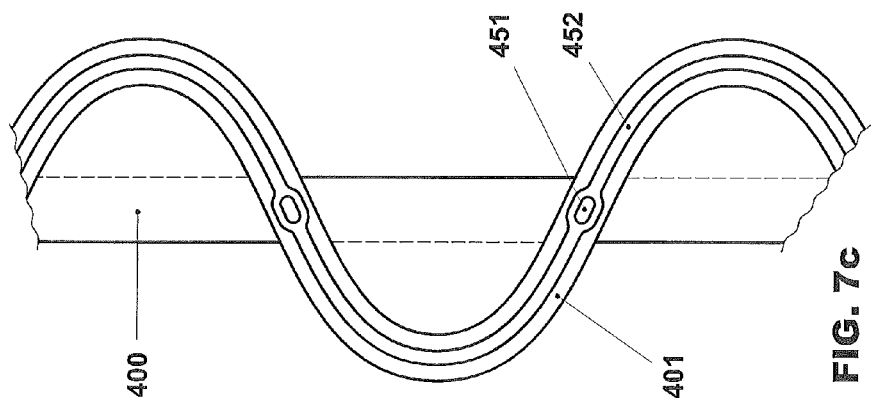
FIG. 7a-c show views against the main flow onto the trailing edge of lobed streamlined bodies and FIG. 8a-b show the flow conditions along a streamlined body.
Figure 7B:
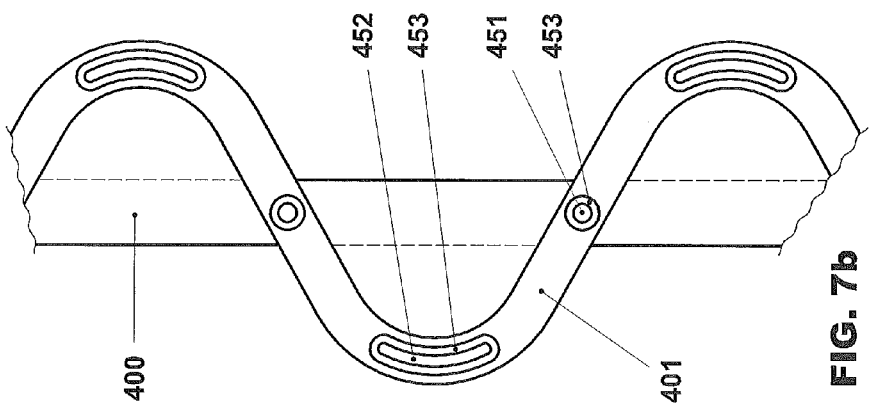
Figure 7A:
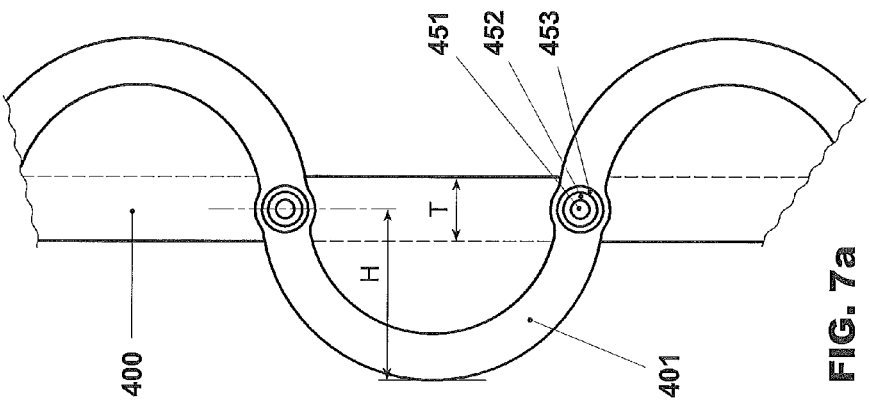

FIGS. 7a, 7b, 7c show views against the main flow onto the trailing edge of lobed streamlined bodies 400 with different nozzle arrangements according to the invention.

FIG. 7a shows an arrangement where first nozzles 451 for injection of liquid fuel, are enclosed by second nozzles 452 for injection of a gaseous fuel, which themselves are encloses by third nozzles 453 for injection of carrier air. The nozzles 451, 452, 453 are arranged concentrically at the trailing edge. Each nozzle arrangement is located where the lobed trailing edge crosses the center plane (see FIG. 8, item 135).

Further the lobe height H from the center plane to apex of a lobe at the downstream end as well as the thickness of the streamlined body T is indicated in the FIG. 7a.

FIG. 7b shows an arrangement where second nozzles 452 for fuel gas injection are configured as a slit-like nozzle extending along the trailing edge each at each apex section of the lobes. Additionally first nozzles 451 for liquid fuel injection arranged at each location where the lobed trailing edge crosses the center plane. All the first and second nozzles 451, 452 are enclosed by third nozzles 453 for the injection of carrier air.

FIG. 7c shows an arrangement where a second nozzle 452 for fuel gas injection is configured as one slit-like nozzle extending along at least one lobe along the trailing edge. For liquid fuel injection additional first nozzles 451 in the form of orifices are arranged in the second nozzles 452.

The lobed mixing concept is described with reference to FIG. 8. FIG. 8 shows the flow conditions along a streamlined body. The central plane 135 of which is arranged essentially parallel to a flow direction 114 of an airflow, which has a straight leading edge 138 and a lobed trailing edge 139. The airflow 114 at the leading edge in a situation like that develops a flow profile as indicated schematically in the upper view with the arrows 114.

The lobed structure 142 at the trailing edge 139 is progressively developing downstream the leading edge 138 to a wavy shape with lobes going into a first direction 130, which is transverse to the central plane 135, the lobe extending in that first direction 130 is designated with the reference numeral 128. Lobes extending into a second transverse direction 131, so in FIG. 8a in a downward direction, are designating with reference numeral 129. The lobes alternate in the two directions and wherever the lobes or rather the line/plane forming the trailing edge pass the central plane 135 there is a turning point 127.

Figure 8A:
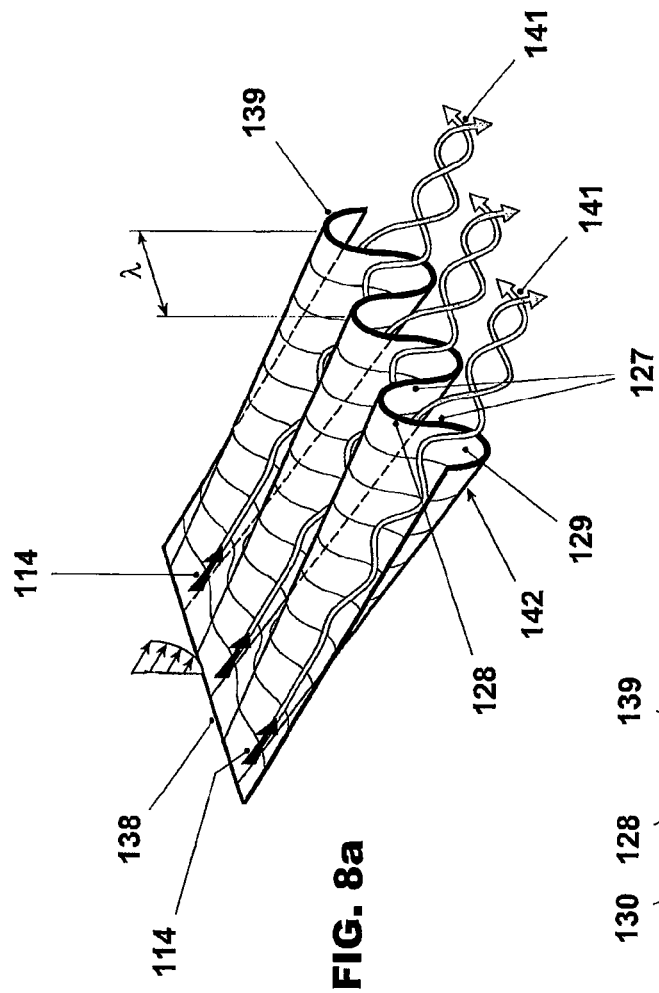

As one can see from the arrows indicated in FIG. 8a, the airflow flowing in the channel-like structures on the upper face and the airflows in the channels on the lower face intermingle and start to generate vortexes downstream of the trailing edge 139 leading to an intensive mixing as indicated with reference numeral 141. Theses vortices 141 are useable for the injection of fuels/air as will be discussed further below.

Figure 8B:
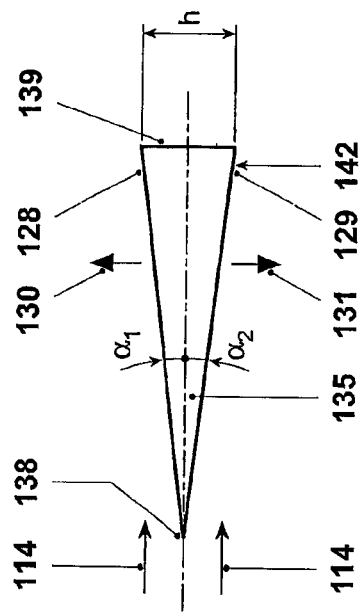

The lobed structure 142 is defined by the following parameters:

the periodicity λ gives the width of one period of lobes in a direction perpendicular to the main flow direction 114;

the height h is the distance in a direction perpendicular to the main flow direction 14, so along the directions 130 and 131, between adjacent apexes of adjacent lobes as defined in FIG. 8b.

the first lobe angle $\alpha_1$ (also called elevation angle) which defines the displacement into the first direction of the lobe 128, and the second lobe angle $\alpha_2$ (also called elevation angle), which defines the displacement of lobe 129 in the direction 131. Typically $\alpha_1$ is identical to $\alpha_2$.

The invention claimed is:

1. A method for operating a gas turbine with sequential combustion, in which the gas turbine includes a compressor, a first combustor with a first combustion chamber and a first burner, the first burner receiving compressed air from the compressor, a second combustor with a second combustion chamber and a second burner, the second burner receiving hot gas from the first combustor with a predetermined second combustor inlet temperature, and a turbine which receives hot gas from the second combustor, wherein the second burner includes an annular duct with a cross-sectional area, a center body arranged in the annular duct, an intermediate fuel injection region located along the center body and connected to the annular duct, wherein the center body is located upstream of the second combustion chamber and terminates at a downstream face of the center body adjacent a second combustion chamber inlet, the method comprising:

injecting fuel in the intermediate fuel injection region;
mixing the fuel with the hot gases received from the first combustor in the second burner;
reducing a flow velocity of the hot gas fuel mixture leaving the second burner by increasing an area of a flow path formed by the annular duct and the second combustion chamber in a stepwise manner from an exit of the annular duct to the second combustion chamber inlet, and wherein a ratio of a perimeter of the exit of the annular duct to a perimeter of the second combustion chamber inlet is in a range of 0.6 to less than 1 and a ratio of a total area of the downstream face of the center body to a total burner exit area, the total burner exit area being defined as the sum of a total area of the annular duct and the total area of the downstream face of the center body, is greater than 0.6.

2. A reheat burner arrangement, comprising:
a first combustion chamber;
an annular duct arranged downstream of the first combustion chamber in a combustion gas flow direction and with a cross-sectional area;
a center body arranged in the annular duct; and
an intermediate fuel injection region located along the center body;
a second combustion chamber, wherein the center body is located upstream of the second combustion chamber and terminates at a downstream face of the center body adjacent a second combustion chamber inlet, and wherein a cross section of a flow path formed by the annular duct and the second combustion chamber increases in a stepwise manner from an exit of the annular duct to the second combustion chamber inlet, wherein a ratio of a perimeter of the exit of the annular duct to a perimeter of the second combustion chamber inlet is in a range of 0.6 to less than 1 and a ratio of a total area of the downstream face of the center body to a total burner exit area, the total burner exit area being defined as the sum of a total area of the annular duct and the total area of the downstream face of the center body, is greater than 0.6.

3. The reheat burner arrangement according to claim 2, comprising:
at least two streamlined bodies arranged in the intermediate fuel injection region, each streamlined body having a streamlined cross-sectional profile, which extend in a longitudinal direction perpendicularly or at an inclination to a main flow direction prevailing in the intermediate fuel injection region, wherein a respective leading edge of each of the at least two streamlined bodies has a respective profile, which is oriented parallel to the main flow direction prevailing at the leading edge, and wherein trailing edges of each of the at least two streamlined bodies are provided with at least two vortex generators, wherein the at least two vortex generators have the same periodicity, wherein a number of vortex generators at the trailing edge of each of the at least two streamlined bodies is identical.

4. The reheat burner arrangement according to claim 2, wherein a leading edge of the at least two streamlined bodies has an aerodynamic profile, which transitions from an inclined orientation relative to a longitudinal axis of the intermediate fuel injection region to an orientation which is parallel to the longitudinal axis of the intermediate fuel injection region in an upstream half of each of the at least two streamlined bodies.

5. The reheat burner arrangement according to claim 2, comprising:
at least two streamlined bodies arranged in the intermediate fuel injection region, each streamlined body having a streamlined cross-sectional profile, which extend in a longitudinal direction perpendicularly or at an inclination to a main flow direction prevailing in the intermediate fuel injection region, wherein a respective leading edge of each of the at least two streamlined bodies has a respective profile, which is oriented parallel to the main flow direction prevailing at the leading edge, and wherein trailing edges of each of the at least two streamlined bodies are provided with at least two lobes oriented in a common circumferential direction, with respect to the annular duct, and wherein a transition from the leading edge of each of the at least two streamlined bodies, respectively, to the at least two lobes is smooth with a surface curvature defined by a function with a continuous first derivative.

6. The reheat burner arrangement according to claim 5, wherein a distance between central planes of the at least two streamlined bodies is at least 1.2 times a height (h) of the at least two lobes.

7. The reheat burner arrangement according to claim 5, wherein a distance between central planes of the at least two streamlined bodies is at least 1.5 times a height (h) of the at least two lobes.

8. The reheat burner arrangement according to claim 5, wherein at least one of the at least two streamlined bodies is configured as an injection device with at least one fuel nozzle for introducing at least one fuel into a burner of the second combustion chamber.

9. The reheat burner arrangement according to claim 8, wherein at least two fuel nozzles of the at least one fuel nozzle are located at the trailing edge of the at least one of the at least two streamlined bodies at each apex of the at least two lobes or at every second apex of the at least two lobes along the trailing edge and/or are located substantially on a central plane of the at least one of the at least two streamlined bodies where a trailing edge of the at least two lobes of the at least one of the at least two streamlined bodies crosses the central plane.

10. The reheat burner arrangement according to claim 8, comprising:
a mixing zone located downstream of said at least two streamlined bodies, and wherein at and/or downstream of said at least two streamlined bodies, the cross-section of said flow path at the mixing zone is reduced by at least 10% compared to the cross-section of said flow path upstream of said at least two streamlined bodies.

11. The reheat burner arrangement according to claim 8, wherein the at least two streamlined bodies are provided with cooling elements having an internal circulation of a cooling medium along sidewalls of the at least two streamlined bodies, and wherein the cooling elements are fed with the cooling medium from a carrier gas feed.

12. The reheat burner arrangement according to claim 8, comprising:
a mixing zone located downstream of said at least two streamlined bodies, and wherein at and/or downstream of said at least two streamlined bodies, the cross-section of said flow path at the mixing zone is reduced by at least 20% compared to the cross-section of said flow path upstream of said at least two streamlined bodies.

13. The reheat burner arrangement according to claim 8, comprising:
a mixing zone located downstream of said at least two streamlined bodies, and wherein at and/or downstream of said at least two streamlined bodies, the cross-section of said flow path at the mixing zone is reduced by at least 30% compared to the cross-section of said flow path upstream of said at least two streamlined bodies.

14. The reheat burner arrangement according to claim 8, wherein the at least two streamlined bodies are provided with film cooling holes located near the trailing edges.

15. The reheat burner arrangement according to claim 8, wherein the at least one fuel nozzle is located at the trailing edge of at least one of the at least two streamlined bodies.

16. The reheat burner arrangement according to claim 15, wherein the at least one fuel nozzle is at least one of a circular slot and an elongated slot nozzle extending along the trailing edges of the at least two streamlined bodies and comprises a first nozzle for injection of liquid, a second nozzle for injection of a gaseous fuel and a third nozzle for injection of carrier air, which encloses the first and the second nozzle.

17. The reheat burner arrangement according to claim 15, wherein a lobe height of each of the at least two streamlined bodies is a function of a radial position of the lobe in the annular duct.

* * * * *